United States Patent

Watson et al.

[11] Patent Number: 5,812,784
[45] Date of Patent: Sep. 22, 1998

[54] METHOD AND APPARATUS FOR SUPPORTING MULTIPLE, SIMULTANEOUS SERVICES OVER MULTIPLE, SIMULTANEOUS CONNECTIONS BETWEEN A CLIENT AND NETWORK SERVER

[75] Inventors: Colin Watson; Andrew M. Herron, both of Issaquah, Wash.

[73] Assignee: Microsoft Corporation, Redmond, Wash.

[21] Appl. No.: 837,846

[22] Filed: Apr. 22, 1997

Related U.S. Application Data

[62] Division of Ser. No. 374,814, Jan. 19, 1995, Pat. No. 5,682,478.

[51] Int. Cl.⁶ .................................................. G06F 13/00
[52] U.S. Cl. .............................. 395/200.57; 395/187.01
[58] Field of Search ....................... 395/200.57, 200.58, 395/187.01, 188.01

[56] References Cited

U.S. PATENT DOCUMENTS

| | | | |
|---|---|---|---|
| 4,782,442 | 11/1988 | Kojima et al. | 395/200.01 |
| 5,057,996 | 10/1991 | Cutler et al. | 395/650 |
| 5,218,602 | 6/1993 | Grant et al. | 370/58.2 |
| 5,276,879 | 1/1994 | Barry et al. | 395/650 |
| 5,384,773 | 1/1995 | Olnowich et al. | 370/60.1 |
| 5,408,646 | 4/1995 | Olnowich et al. | 395/575 |
| 5,553,239 | 9/1996 | Heath et al. | 395/187.01 |

OTHER PUBLICATIONS

"LAN Manager—A Programmer's Guide," by Ralph Ryan, pp. 12–28, Microsoft Press (1990).
Comer, Douglas E., "Internetworking With TCP/IP, vol. I, Principles, Protocols, and Architecture", pp. Title Page, 335–390, 1991.

*Primary Examiner*—Lance Leonard Barry, Esq.
*Attorney, Agent, or Firm*—Leydig, Voit & Mayer, Ltd.

[57] ABSTRACT

An apparatus and method are described for supporting a plurality of connections between a client computer and a network server. The client computer supports a plurality of simultaneously logged on ("active") services. The client computer creates a connection for each set of distinct credentials supplied by services logged onto the client computer. The client computer includes a redirector for maintaining independent control, status and data information for a plurality of independent connections associated with the plurality of simultaneously active services having distinct sets of credentials.

29 Claims, 5 Drawing Sheets

Logon List Element

Server Control Block

File Control Block

Instance Control Block

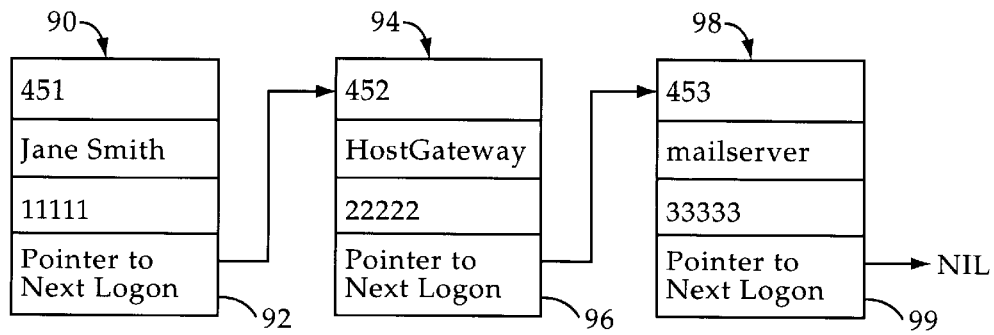
FIG. 7 Logon List
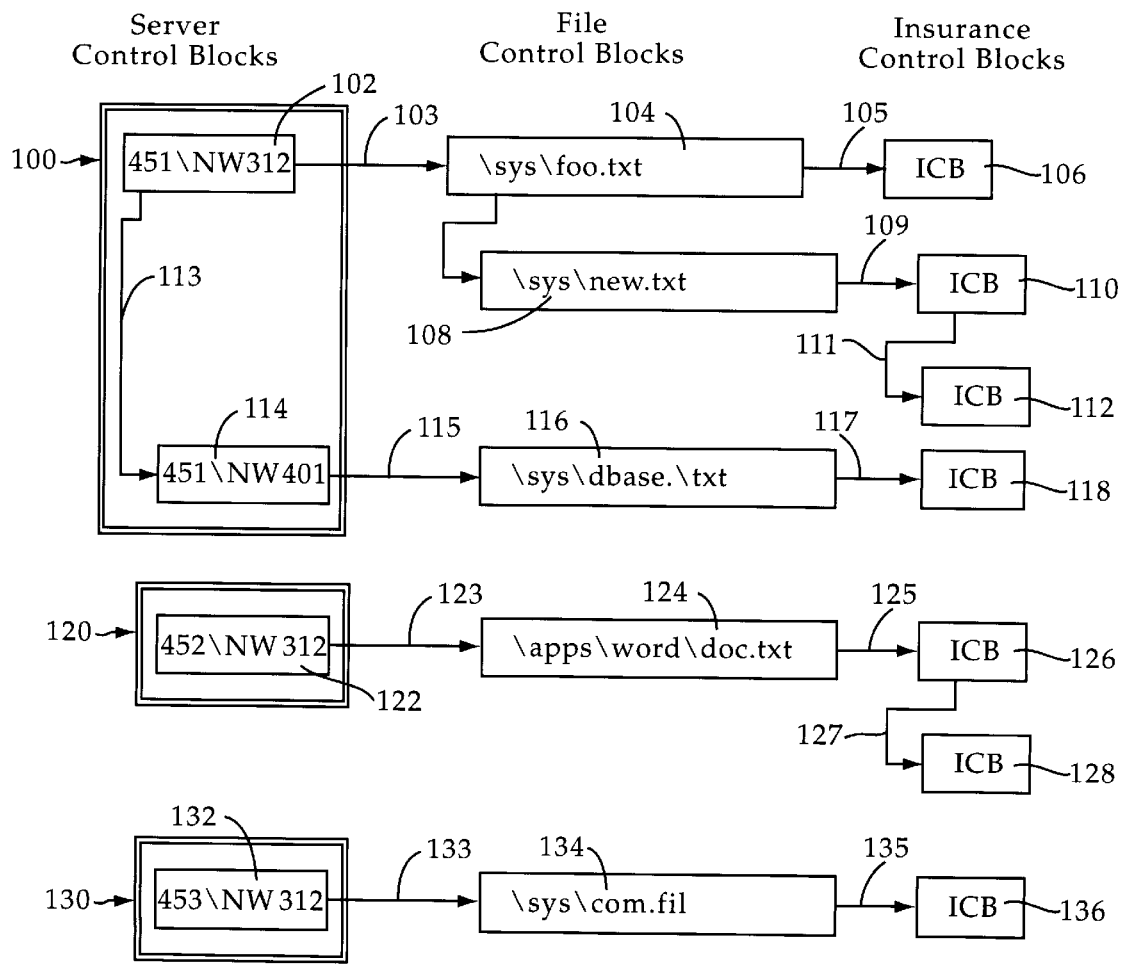
FIG. 8

METHOD AND APPARATUS FOR SUPPORTING MULTIPLE, SIMULTANEOUS SERVICES OVER MULTIPLE, SIMULTANEOUS CONNECTIONS BETWEEN A CLIENT AND NETWORK SERVER

This is a divisional of application Ser. No. 08/374,814, filed on Jan. 19, 1995, now U.S. Pat. No. 5,682,478.

AREA OF THE INVENTION

The present invention generally relates to an apparatus and method for coordinating the requests and responses between client computers and server computers in a network, and more particularly to the simultaneous maintenance of a plurality of connections, or virtual circuits, between a client computer and a server computer on a network.

BACKGROUND OF THE INVENTION

The utilization of networks as a means for fulfilling users' computing needs has increased quite substantially in recent years. Networks, especially those including a central file system shared by the networked computers, offer the advantage over standalone personal computers of providing users access to a wide variety of computer resources without consuming large quantities of storage space on the personal computers' local drives. The storage saving advantage is achieved by storing application programs and databases within a shared data storage device connected via a network to a plurality of client computers.

In a network environment, a network server is a network entity associated with a resource shared by a network. The network-server receives requests for the shared network resource from network entities referred to as client computers. The network server acts upon the requests and issues responses to the client computers.

In the example provided above of a shared data storage device connected to a plurality of client computers, a network file server provides client computers access to the data on the network file server's shared data storage device by receiving requests from the client computers for resources provided by the shared data storage device, acting upon the requests, and returning a response to the client computers.

After a client computer transmits a request to a network server, a response from the network server to the client computer's request may be delayed because a requested network resource is not currently available. For example, the requested resource may be currently allocated solely to another client computer in the network, or the network server may be inoperative and thus unable to respond to any client computer requests. Other instances in which a client computer may experience substantial wait times in receiving a response to a request include client computer requests which require a substantial amount of processing in order to complete. An extended wait time is also incurred for receiving a response to a network request when the request must be routed through a number of heavily traversed routing nodes before reaching its intended network server destination.

A feature of personal computer operating systems which is gaining popularity as microprocessor speeds and RAM memory capacity increases is the ability to run a plurality of processes simultaneously by time switching the plurality of processes. A personal computer maintains a list of active processes. Each of the simultaneously active processes is executed on the processor for a period of time until the process is interrupted. Therefore, in a network environment having client computers capable of having a plurality of simultaneously active processes, a process running on a client computer typically relinquishes its claim to the client computer's processor after issuing a network request to a network server so that other tasks associated with other active processes may be performed while the process waits for a response to the network request. The processor is then claimed by another one of the plurality of processes.

A "service" is a set of one or more processes treated as a single logical entity by a computer system when invoked. Examples of services include an interactive user service associate with the user interface devices in a system such as the display and keyboard, a well known Systems Network Architecture (SNA) Host Gateway service; a Standard Query Language (SQL) Database service; and an email service. These examples are merely illustrative examples and many others will be known to those skilled in the art.

A network redirector on a client computer facilitates access by services on a networked computer to other machines on a network. The redirector accomplishes this function by receiving network requests from processes associated with various services and directing the network requests to a proper transport layer (in the context of the OSI Network model) network driver. A "connection" is a communication channel established between two computers for supporting a conversation between the two computers for which each computer maintains state information. In order to transmit network requests from a service on a client computer to a destination computer, the redirector establishes a connection to the destination computer and maintains information regarding the state of the network requests.

In the multi-processing environment, more than one of a plurality of simultaneously running processes may attempt to issue a network request to a same network server via a redirector. Therefore, when developing an operating system for a network, one must consider a situation where a second network request arises in a client computer for which a first network request is still pending.

In accordance with the known NETWARE (Novell, Inc.) Core Protocol (NCP), a client computer and network server coordinate network requests from client computer processes in a request and acknowledge mode wherein only a single outstanding request is allowed on a connection between the client computer and a network server. After a client computer transmits a first request to a network server, the client computer withholds issuing a second request to the network server on the connection until a response is received from the network server for the first request. Thus, the process from which the second request arises cannot continue until a response is received by the client computer for both the second request and the earlier issued first request.

In a known networked computer system, a redirector, while capable of supporting a plurality of simultaneously active services, supports only a single connection between a client computer and a network server. Furthermore, in the known computer system the redirector does not distinguish between the various services (which share a single set of credentials) when executing network requests in accordance with a request from one of the services associated with the redirector. In this known system, a server cannot limit access to only certain services which pass their requests to the server via a single redirector which creates and maintains a connection to the server.

The sharing of a single connection by a plurality of services in accordance with the known system limits the performance capabilities of computer systems, such as those operating under the NCP, wherein only a single outstanding network request is supported. In multiprocessing systems operating under NCP, a process issuing a second network request on a connection must wait for the system to receive a response to a first network request over the connection before the second network request can be issued by the system over the connection.

Security systems, when implemented in a network environment, are closely associated with network redirectors. The security systems ensure that data shared on a network connection associated with a redirector is protected from unauthorized access, use, or modification. When a redirector receives a network request from a logged on service, network security systems determine whether the network request from the logged on service is allowed. Requests for network resources via a connection are coupled to identification and authentication information associated with a logged on service. The security systems verify that the authenticated service is entitled to submit the received network request.

When developing security mechanisms for a network operating system in a client computer supporting a plurality of services or sessions, one must also consider how to implement security measures on the client computer, and in particular how to utilize passwords when more than one service may currently be active. In a known network security system, an access token is constructed from the identification and authentication information supplied by a user while logging onto a client computer. The access token identifies the authenticated user and privileges allocated to the authenticated user. However, neither the access token nor a redirector reading a request specifying the access token links the privileges to services from which the requests originate.

SUMMARY OF THE INVENTION

It is an object of the present invention to ensure that a network request to a network server on a first service does not block the transmission of a second network request to a same network server submitted by a second, independent service running on a multiprocessing computer.

It is yet another object of the present invention to support a number of simultaneously active services on a client computer specifically linked to distinct service identification and authentication information (credentials).

The above described and other objects are fulfilled by a new apparatus and method for supporting multiple connections between a client computer and a network server. The client computer supports a plurality of simultaneously logged on ("active") services. The client computer creates a connection for each set of distinct credentials supplied by services logged onto the client computer. The client computer includes a redirector for maintaining independent control, status and data information for a plurality of independent connections associated with the plurality of simultaneously active services having distinct sets of credentials.

In accordance with an embodiment of the invention, a client computer includes a list of logon elements. Each logon element corresponds to a logged on service on the client computer. The list of logon elements contain the identification and authentication information associated with each logged on service.

In accordance with an embodiment of the invention, each independent connection is associated with a logged on family of related processes (service) and an identified network server. Therefore, two different services logged onto a same client computer have two independent connections.

In accordance with an embodiment of the invention, the control, status and data information associated with the independent connections includes server control blocks. Each server control block corresponds to a connection for a logged on service. As additional connections are created for logged on services on the client computer, the redirector creates additional server control blocks corresponding to the connections. If a logged on service is connected to a plurality of servers, separate server control blocks are maintained by the redirector for each connection.

The present invention improves the performance of a client computer capable of running a plurality of simultaneously active processes which submit network requests to a same network server in accordance with the single outstanding request rule of NCP. Furthermore, providing a plurality of connections between the client computer and network server facilitates logically linking a connection to a specific logged on service.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 7 is a schematic depiction of a logon list comprising three logon list elements corresponding to the three logged on services depicted in FIG. 2;

FIG. 8 is a schematic depiction of an illustrative arrangement of the SCB, FCB and ICB components for a redirector for maintaining connection state information in accordance with the connection scheme depicted in FIG. 2;

DETAILED DESCRIPTION OF THE DRAWINGS

Figure 1:
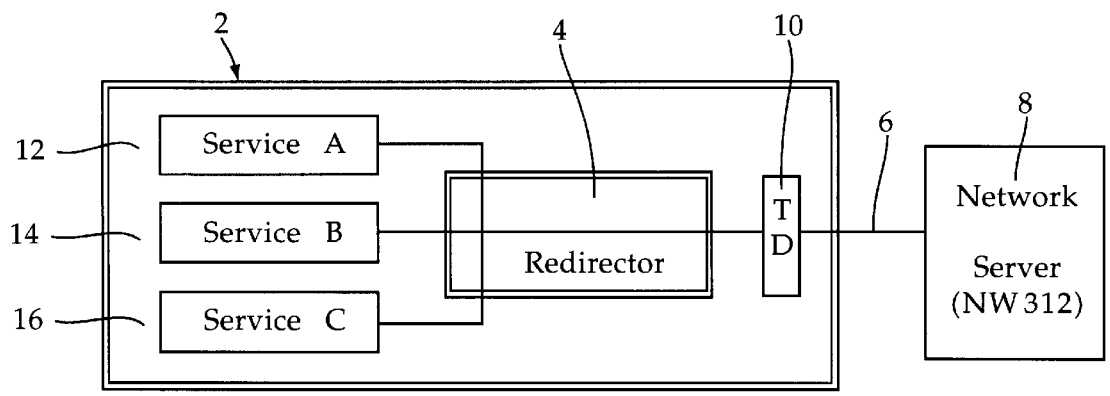
FIG. 1 is a schematic diagram of a prior art network connection scheme between a client computer and a network server computer wherein a single redirector supports a single transport layer connection between the client computer having a plurality of logged on services and the network server.

Turning now to FIG. 1, a known network redirector connection arrangement for a client and server is schematically depicted. In the prior art example, a client computer 2 comprises a redirector 4 supporting a connection 6 to a Network Server 8 via a transport driver (TD) 10. Furthermore, the client 2 provides security mechanisms for authenticating users when users attempt to access the resources provided by a Service A 12, a Service B 14 or a Service C 16.

A connection 6 is created in response to a network request by the Service A 12, Service B 14, or Service C 16. Alternatively, the connection 6 is established in response to one of the Services 12, 14 or 16 supplying explicit credentials to the Network Server 8 via the redirector. The connection 6 comprises a collection of transport layer (in the OSI network model) processes which represent the client computer 2 and its set of logged on services 12, 14 and 16.

In the known networked client computer 2 illustratively depicted in FIG. 1, the services share a single set of credentials which are provided to the redirector 4 when any one of the services 12, 14 or 16 logs onto the client computer 2. After one of the three services (Service A 12, Service B 14, or Service C 16) logs onto the client computer 2 and the redirector establishes a connection with the network server 8, all three services share a single set of credentials when directing requests to the Network Server 8. However, in this known redirector scheme a network administrator cannot designate access to the Network Server 8 through specific ones of the services associated with the redirector 4. Since the Network Server 8 cannot identify a service from which a network request originated, if one service associated with the redirector 4 may access the Network Server 8, all of the logged on services associated with the redirector 4 may submit requests to the Network Server 8.

An additional drawback of the prior art redirector illustrated in FIG. 1 which supports a single connection between the client computer 2 and Network Server 8 is the limitation on throughput resulting from the absence of a plurality of connections between the client computer 2 and Network Server 8. The known redirector 4 utilizes the NCP. The NCP supports a single outstanding network request between a server and client on a connection. Therefore, if a first network request is submitted via Service A 12, control switches to the Service B 14, and service B 14 submits a second network request prior to the redirector 4 receiving a response to the first network request; then the second network request is blocked and will not be transmitted by the redirector 4 (via the single connection 6) until the response to the first network request is received by the redirector 4.

In summary of the above, the known redirector 4 schematically illustrated in FIG. 1 does not (1) distinguish between services associated with the redirector 4 credentials, or (2) allow multiple outstanding network requests from separate services on a single client computer.

Figure 2:
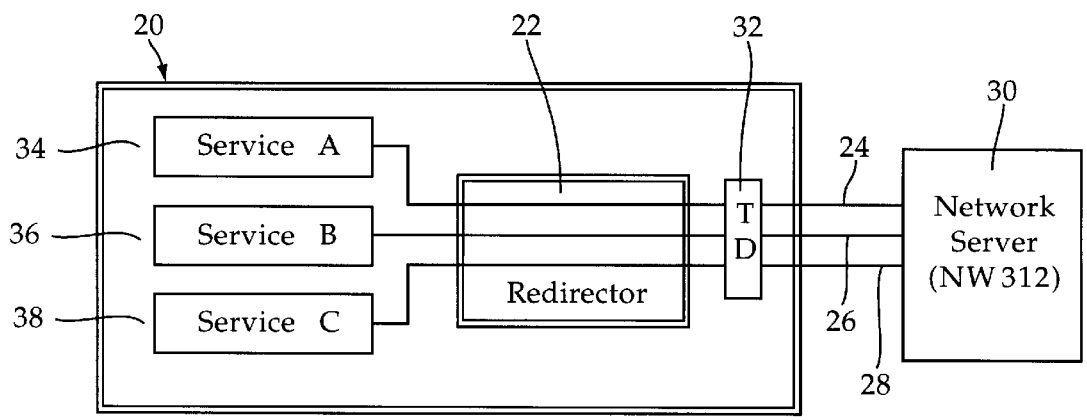
FIG. 2 is a diagram of a network connection scheme between a client computer and a network server computer wherein the redirector supports a plurality of connections between the client computer and network server in accordance with an embodiment of the present invention.

Turning now to FIG. 2, a network redirector connection arrangement embodying the present invention is schematically depicted. In the illustrative embodiment depicted in FIG. 2, a client computer 20 operating system includes a program manager supporting a plurality of services (Service A 34, Service B 36, and Service C 38). The client computer 20 comprises a multi-connection redirector 22 supporting a plurality of connections 24, 26 and 28 to a Network Server 30 via a transport driver (TD) 32. Furthermore, the client 20 provides known security mechanisms for authenticating credentials when the Service A 34, the Service B 36 or the Service C 38 attempts to communicate a request for the resources associated with the Network Server 30 via the connections 24, 26 or 28.

The connections 24, 26 and 28 are independently established between the client computer 20 and the network server 30. Connection 24 is established when the Service A 34 issues a request to the Network Server 30, connection 26 is established when the Service B 36 issues a request to the Network Server 30, and connection 28 is established when the Service C 38 issues a request to the Network Server 30. Each connection between the client computer 20 and network server 30 is associated with a separate set of credentials associated with a logged on service. In an alternative embodiment of the invention, more than one service may be associated with a connection. However, the redirector 22 supports a plurality of connections, and less than all of the services are associated with a single connection (i.e., at least one service is associated with a second connection maintained by the redirector 22 with the Network Server 30). The separate and independent logging on of each service enables a server to distinguish between requests of various services associated with different connections. This in turn allows the system administrator to selectively limit access by a server to only certain services on a client computer with which a connection to a network server is associated. In the illustrative embodiment of the invention, the credentials for a service comprise a username and a password supplied by a service when a service logs onto the client computer 20. A service's credentials may be entered by a user via a keyboard. However, other forms of credential allocation schemes, including a magnetically encoded identification and personal identification number, would be known to those skilled in the art of computer security schemes.

Furthermore, since the redirector 22 maintains separate connections 24, 26, and 28 for the Service A 34, the Service B 36, and the Service C 38 to a network server 30, the blocking problem (described above) associated with the prior art redirector scheme of FIG. 1 is avoided with respect to the separately connected services. In the illustrative embodiment of the invention, the client 20 may transmit a first request from Service A 34 and then transmit a second request on Service B 36 (or Service C 38) prior to receiving a response to the first request without violating the "one outstanding request per connection" limitation associated with the NCP since the first and second requests are associated with distinct connections.

Figure 3:
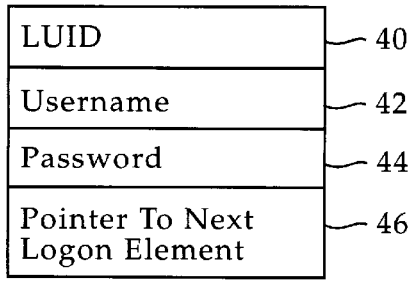
FIG. 3 is a schematic depiction of a logon list element comprising logon data for an authenticated service on a client computer.

Having generally described an embodiment of the invention, attention is now directed to individual components of the client computer 20, and in particular the redirector 22, that facilitate the creation and maintenance by the client computer 20 of multiple, connections between a client computer and network server associated with specified services. Turning now to FIG. 3, the redirector 22 creates a logon list element for each logged on service. Each logon list element specifies a Local Unique Identification (LUID) 40 assigned by the security system (not shown) of the client computer 20 identifying an authenticated service to the redirector 22. In an alternative embodiment of the invention, the LUID may be associated with a plurality of services which will share a single connection to a network server.

Each logon list element also specifies a username 42 provided by a service while logging onto the client computer 20. The illustrated logon list element also includes a password 44 associated with the username 42. Together, the username 42 and the password 44 comprise the set of credentials utilized by a network security system for creating an access token for a logged on service from a policy database defining privileges and limitations associated with sets of credentials. The username 42 is included in network requests during connection creation and is used directly by the Network Server 30 to determine whether a request is authorized. The LUID 40, username 42, and password 44 are provided by the security system to the redirector 22 after the security system verifies a service's credentials.

The manner in which the username and password information are provided is a design consideration. For example, the interactive user service usually obtains the credentials from a user via the user interface of the client computer 20. Other services obtain the credentials used by the services during logon through pre-stored lists of credentials maintained by a network administrator. Other suitable methods for obtaining credentials to be used by a service during logon will be known by those skilled in the art.

In the illustrative embodiment of the invention, the logon list elements are maintained in a linked list of records. Each logon list element includes a Pointer To Next Logon Element 46 providing a link to a next logon list element. Other suitable alternative data structures for maintaining a list of service credentials would be known to those skilled in the art. Such alternative data structures include, for example, an array of records.

Figure 4:
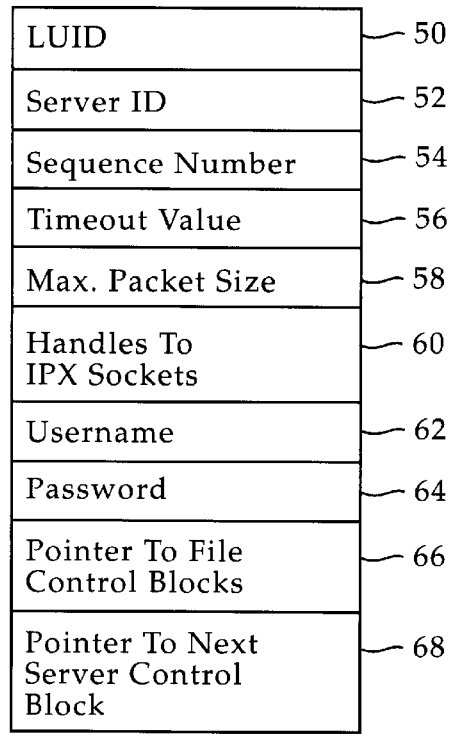
FIG. 4 is a schematic depiction of a server control block (SCB) comprising identification information for an authenticated service and behavior specifications for the identified authenticated service.
Figure 5:
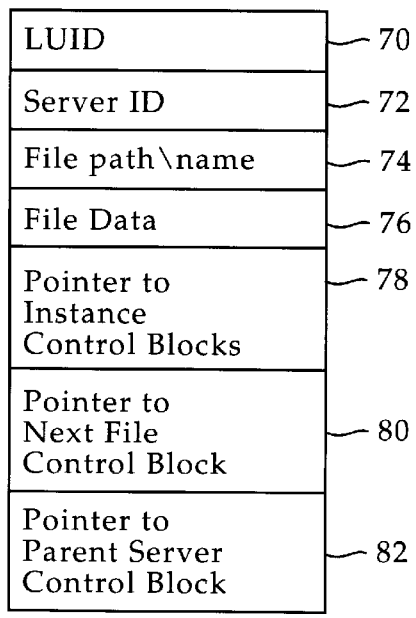
FIG. 5 is a schematic depiction of a file control block (FCB) comprising information relating to a specified file for an authenticated service.
Figure 6:
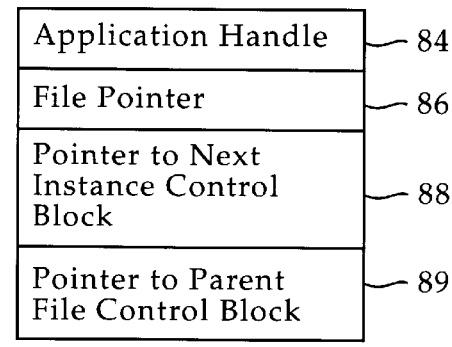
FIG. 6 is a schematic depiction of an instance control block (ICB) comprising information relating to a part of a specified file currently accessed by an authenticated service.

Turning now to FIGS. 4–6, the redirector 22 for the client computer 20 maintains data, status and control information for a plurality of network connections between the client computer 20 and the network server 30. It is noted that the contents of the redirector components illustrated in FIGS. 4, 5 and 6 described below are illustrative. Other suitable components for maintaining a plurality of connections between the client computer 20 and the Network Server 30 will be known to those skilled in the art in view of the illustrative embodiment of FIGS. 4, 5 and 6 and the detailed description below.

Turning to FIG. 4, a Server Control Block includes data, status and control information for a specified connection supported by the redirector 22. The redirector 22 creates and maintains a Server Control Block for each separate connection (identified by an LUID and network server identification). In the illustrated embodiment of the invention, each connection corresponds to a specific logged on service. Each Server Control Block includes an LUID 50 specifying a unique identifier for a logged on service associated with the Server Control Block. Each Server Control Block also includes a server identification 52 specifying a unique identification for a connected network server. Together, the LUID 50 and server identification 52 specify a unique connection to be used by processes running on a service and a particular network server.

Each Server Control Block also includes status and control information for maintaining a conversation with the specified network server. A sequence number 54 specifies a value which is to be assigned by the redirector 22 to the next packet of information transmitted on the specified connection. A time out value 56 specifies a minimum period of time the redirector 22 will wait before retransmitting a network request to the server 30. A maximum packet size 58 specifies the number of bytes of data which may be included in a data packet transmitted via the specified connection.

Each connection is allocated a set of IPX sockets. Accordingly, each Server Control Block in the illustrative embodiment of the present invention includes a set of handles to IPX sockets 60. IPX is a well known transport level (in the ISO model) protocol. The set of handles to IPX sockets 60 identify processes residing within the client computer 20, and the set of handles to IPX sockets 60 act as receiving and transmitting points for communications between the redirector and a network server 30 on a network connection. The set of handles to IPX sockets 60, provided initially by the transport driver 32, enable the transport driver 32 to associate transmission requests and responses from the network server 30 with a connection.

Each Server Control Block includes a username 62 and a password 64. If a service supplies explicit (network server specific) credentials when an initial network request is made by the service (resulting in the creation of a connection by the redirector 22 and the Network Server 30), then these values are stored in the username 62 and password 64. Otherwise the username 62 and password 64 are filled by accessing the username 42 and password 44 comprising the authenticated credentials of the service associated with the connection. Each Server Control Block also includes a Pointer To File Control Blocks 66 associated with the Server Control Block. The contents of the File Control Blocks are described in detail below in conjunction with a detailed description of FIG. 5.

Each Server Control Block also includes a Pointer To Next Server Control Block 68. The Pointer To Next Server Control Block 68 specifies a link to a next Server Control Block for an authenticated service having a same specified LUID, but specifying a different network server. The beginning addresses for Server Control Blocks for services not having a same LUID are maintained in a list of pointers (not shown). Other suitable alternative data structures for maintaining a set of Server Control Blocks would be known to those skilled in the art. Such alternative data structures include, for example, pointers to Server Control blocks arranged as a two dimensional array of records specified primarily by LUID and secondarily by network server.

Turning to FIG. 5, the status and control information for a connection supported by the redirector 22 comprises a File Control Block containing information relating to a specified file associated with an authenticated server process and service identified in a Server Control Block to which the File Control Block is linked. The File Control Block includes an LUID 70 specifying a unique identifier for a logged on service associated with the File Control Block. The File Control Block also includes a Server Identification 72 specifying a unique identification for a connected network server. The File Path\Name 74 specifies a file name and a directory path on the connected network server identified by the Server ID 72. The File Control Block also includes File Data 76 containing a portion of the file specified by the File Path\Name 74 in the connected network server. Each File Control Block also includes a Pointer To Instance Control Blocks 78 associated with the File Control Block. The contents of the Instance Control Blocks are described in detail below in conjunction with a detailed description of FIG. 6.

Each File Control Block also includes a Pointer To Next File Control Block 80. The Pointer To Next File Control Block 80 specifies a link to a File Control Block associated with a same specified Server Control Block. Thus, when a service accesses a plurality of files through a same connection, the redirector 22 maintains portions of the files in separate, linked File Control Blocks. The maintenance of a plurality of File Control Blocks for a same connection reduces the instances when it is necessary for the redirector 22 to request a file from a connected network server when a service is accessing a plurality of files in an interleaved manner since the file data is maintained even when the service accesses another file provided by a connected network server.

While the illustrative embodiment of the invention links related File Control Block records by means of pointers contained in the Pointer To Next File Control Block 80, other suitable alternative data structures for maintaining a set of File Control Blocks would be known to those skilled in the art. Such alternative data structures include, for example, pointers to File Control Blocks arranged in an array of records specifying the beginning addresses of File Control Blocks associated with a specified Server Control Block.

Each File Control Block also includes a Pointer To Parent Server Control Block 82. The Pointer To Parent Server Control Block 82 contains the starting address of the Server Control Block with which the File Control Block is associated. This pointer enables the redirector to quickly return to a Server Control Block from the File Control Block.

Turning to FIG. 6, the status and control information for a connection supported by the redirector 22 comprises an Instance Control Block having an Application Handle 84. The Application Handle 84 uniquely identifies a process running within a service that caused the file identified in an associated File Control Block to be retrieved from the Network Server 30. The Application Handle 84 enables the redirector 22 to distinguish between multiple uses of a same file by one or more processes running under a service associated with a specified connection.

Each Instance Control Block also includes a File Pointer 86 specifying a current location in the currently accessed File currently accessed by the process specified in the Application Handle 84. The Instance Control Block also includes a Pointer To Next Instance Control Block 88. The Pointer To Next Instance Control Block 88 specifies an address for a next Instance Control Block associated with a same File Control Block.

While the illustrative embodiment of the invention links related Instance Control Block records by means of pointers contained in the Pointer To Next Instance Control Block 88, other suitable alternative data structures for maintaining a set of Instance Control Blocks would be known to those skilled in the art. Such alternative data structures include, for example, pointers to Instance Control Blocks arranged in an array of records specifying the beginning addresses of Instance Control Blocks associated with a specified File Control Block.

The Instance Control Block also includes a Pointer To Parent File Control Block 89. The Pointer To Parent File Control Block contains the starting address of the File Control Block with which the Instance Control Block is associated. This pointer enables the redirector 22 to quickly return to a File Control Block from the Instance Control Block.

Having described the individual building blocks for the data, status and control information associated with the redirector 22 in the illustrative embodiment of the present invention, attention is now directed to FIGS. 7 and 8 comprising a schematic illustration of the information stored in the redirector 22. It should be understood that the configuration of the data, status and control information associated with the redirector is dynamic and changes as services log onto the client computer 20, request resources from a network server such as the Network Server 30 (resulting in the creation of a connection), access files via the network connection and log off the client computer 20.

Turning now to FIG. 7, an illustrative example of a linked list of logon elements maintained by the redirector 22 is schematically depicted. The logon list in FIG. 7 comprises three logon list elements associated with the separate and independent Service A 34, Service B 36 and Service C 38 on the client computer 20. A logon list element 90 having a username JaneSmith, a password "11111", and an LUID "451" (provided to the redirector 22 by the security system for the client computer 20 when a service successfully logs onto the client computer 20) is located at the head of the logon list. The logon list element 90 is associated with the Service A 34 (an interactive user service). All processes created by the Service A 34 will have the same LUID. The Pointer to Next Logon 92 for the logon list element 90 comprises the address of a second logon list element 94.

The second logon list element 94 is associated with the Service B 36 (an SNA service). The security system has assigned an LUID "452" to the second logon list element 94. The second logon list element 94 is associated with a username HostGateway having a password "22222". Thus, Service A 34 and Service B 36 possess separate and distinct logon identities (LUID's). The Pointer to Next Logon 96 for the second logon list element 94 comprises an address of a third logon list element 98.

The third logon list element 98 is associated with the Service C 38 (an email service). The security system has assigned an LUID "453" to the third logon list element 98. The third logon list element 98 is associated with a username "mailserver" having a password "33333". The Pointer to Next Logon 99 for the logon list element 98 comprises a NIL address. The NIL address indicates to the redirector 22 or any other process reading the list that the third logon list element 98 is presently the final logon list element for the client computer 20. Alternative appropriate end-of-list identifiers would be known to those skilled in the art.

Finally, it is noted with respect to FIG. 7, that the linked list of logon list elements is merely an illustrative example. Other suitable data structures for maintaining a list of logon list elements will be known to those skilled in the art. For example, an array data structure may alternatively be used having a specified maximum number of concurrent logged on services provided by the client computer 20. Furthermore, it will be understood by those of ordinary skill in the art that alternative multiple connection client computers may not include security systems or require a user to logon (provide a username) to a service connected to a network server. Such systems would likely not include the same information in their logon list elements as the logon list elements described above. However, the list would include an identifier for a service (or group of services) associated with a same connection when the service (or one of the group of services) makes a network request to a network server.

Turning now to FIG. 8, an illustrative example is provided of the Server Control Blocks, File Control Blocks, and Instance Control Blocks maintained by the redirector 22 in accordance with the present state of each of the services 34, 36 and 38 to network servers NW312 and NW401 (not shown). A first linked list of server control blocks 100 associated with the Service A 34 includes a Server Control Block 102. The Server Control Block 102 is associated with the connection 24 identified by an LUID "451" and a network server "NW312". The Server Control Block 102 contains status information for the connection 24 associated with the Service A 34. The Pointer To File Control Blocks 103 of the Server Control Block 102 points to a File Control Block 104 associated with a file on the Network Server 30 specified by the path and file name "\sys\foo.txt".

The Pointer To Instance Control Blocks 105 of the File Control Block 104 points to an Instance Control Block 106 specifying the position in the file "foo.txt" of the Network Server 30 previously accessed by the Service A 34 via the connection 24. Since only a single Instance Control Block is associated with the File. Control Block 104, the Pointer to Next Instance Control Block equals NIL for the Instance Control Block 106. The NIL value indicates the end of the Instance Control Blocks associated with the File Control Block 104. Though not shown in FIG. 8, the last Instance Control Block in each linked list of Instance Control Blocks associated with a specified file includes a NIL value for its Pointer To Next Instance Control Block.

A Pointer To Next File Control Block 107 of the File Control Block 104 points to a File Control Block 108 associated with a file on the Network Server 30 specified by the path and file name "\sys\new.txt". The Pointer To Instance Control Blocks 109 for the File Control Block 108 points to an Instance Control Block 110 specifying a first location in the file "\sys\new.text" previously accessed by the Service A 34 via the connection 24. A Pointer To Next Instance Control Block 111 points to an Instance Control Block 112 specifying a second location in the file "\sys\new.txt". A Pointer to Next File Control Block for the File Control Block 108 equals NIL. The NIL value indicates the end of the File Control Blocks associated with the Server Control Block 102. Though not shown in FIG. 8, the last File Control Block associated with a specified Server Control Block includes a NIL value for its Pointer To Next File Control Block.

Though not shown in FIG. 2, the Service A 34 is connected to a network server identified as "NW401" via a connection separate and distinct from the connection 24 to the Network Server 30. A Pointer To Next Server Control Block 113 points to a Server Control Block 114 associated with the connection identified by the LUID "451" and the network server "NW401". The Pointer To File Control Blocks 115 for the Server Control Block 114 points to a File Control Block 116 associated with a file on the network server identified as "NW401" specified by the path and file name "\sys\dbase.txt". The Pointer To Instance Control Blocks 117 of the File Control Block 116 points to an Instance Control Block 118 specifying a position in the file "\sys\dbase.txt" of the Network Server 30 previously accessed by the Service A 34 (interactive user service) via the connection to the NW401 server. Since the Server Control Block 114 is the last Server Control Block associated with the Service A 34, the Pointer To Next Server Control Block for the Server Control Block 114 equals NIL. Though not shown in FIG. 8, the last Server Control Block associated with each linked list of Server Control Blocks includes a NIL value for its Pointer To Next Server Control Block.

A second linked list of server control blocks 120, associated with the Service B 36, includes a Server Control Block 122. The Server Control Block 122 is associated with the connection 26 identified by an LUID "452" and a network server "NW312". The Server Control Block 122 contains status information for the connection 26 associated with the Service B 36. The Pointer To File Control Blocks 123 for the Server Control Block 122 points to a File Control Block 124 associated with a file on the Network Server 30 specified by the path and file name "\apps\word\doc.txt". The Pointer To Instance Control Blocks 125 of the File Control Block 124 points to an Instance Control Block 126 specifying a position in the file "\apps\word\doc.txt" of the Network Server 30 previously accessed by the Service B 36 via the connection 26. A Pointer To Next Instance Control Block 127 points to an Instance Control Block 128 specifying a second location in the file "\apps\word\doc.txt" previously accessed by the Service B 36 via the connection 26.

A third linked list of server control blocks 130, associated with the Service C 38, includes a Server Control Block 132. The Server Control Block 132 is associated with the connection 28 identified by an LUID "453" and a network server "NW312". The Server Control Block 132 contains status information for the connection 28 associated with the Service C 38. The Pointer To File Control Blocks 133 for the Server Control Block 132 points to a File Control Block 134 associated with a file on the Network Server 30 specified by the path and file name "\sys\com.fil". The Pointer To Instance Control Blocks 135 of the File Control Block 134 points to an Instance Control Block 136 specifying the position in the file "\sys\com.fil" of the Network Server 30 previously accessed by the Service C 38 via the connection 28.

In closing, with respect to FIG. 8, it is noted that the configuration of the data, status and control information for the separate and independent connections supported by the redirector 22 is illustrative and other suitable organization schemes for maintaining the data, status and control information for the plurality of connections in accordance with the present invention will be known to those skilled in the art in view of the illustrative embodiment. Though arrays of records are less flexible than linked lists of records in terms of sizing a list, arrays are suitable alternatives when sized appropriately to cover foreseeable operating conditions in terms of: the number of logged on services, the number of connections to network servers, the number of files accessed concurrently on a single connection, and the number of points accessed within the accessed files.

Having described the components of the redirector 22 facilitating the maintenance of a plurality of connections between a client 20 and a network server, attention is now directed to the processes and procedures executed by the client computer 20 to establish and maintain a plurality of connections between the client computer 20 and the Network Server 30 by means of the redirector 22, and to execute network server requests issued by the services associated with the connections.

In the illustrative embodiment of the invention, the redirector 22 is incorporated into a secure network. Therefore, prior to establishing a connection to the network server 30, a service must log on the client computer 20 and provide identification and authentication information to a network security system. After the security system determines the privileges and limits of the authenticated service, the security system provides a message to the redirector 22 containing an LUID, username and password for the authenticated service. The redirector 22 uses this information to build a logon list element for the authenticated service. Thereafter, in response to a first network request from the service, a connection associated specifically with the authenticated service is established between the client computer 20 and the network server 30. Though a detailed description of the logon process follows, additional description of the logon process and the security system is provided by *Inside Windows NT*, by Helen Custer, © 1993 Microsoft Press which is incorporated by reference.

Figure 9:
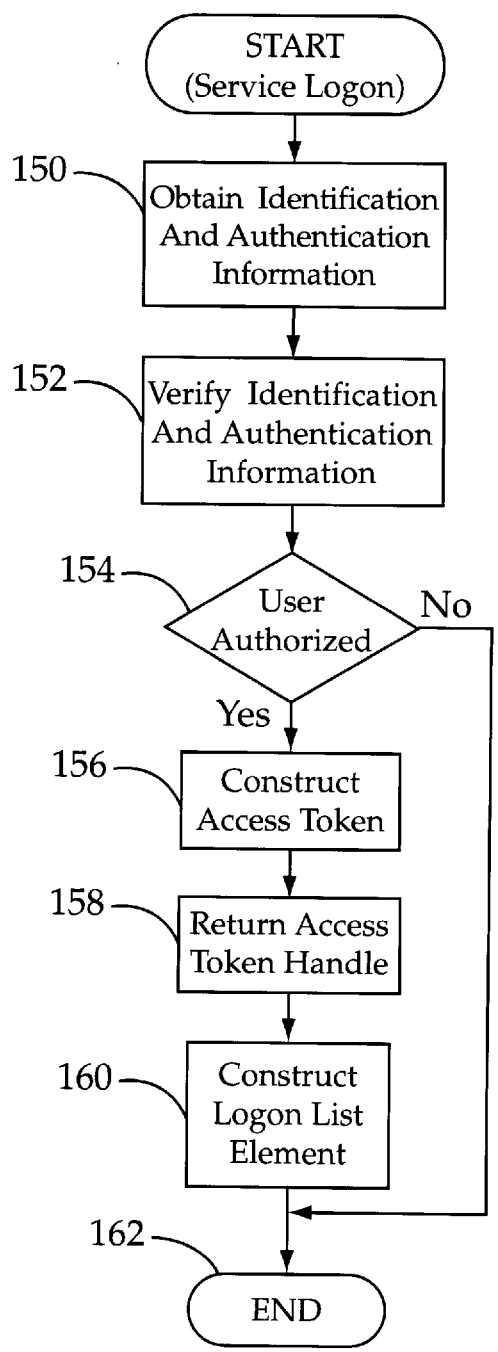
FIG. 9 is a flow chart summarizing the steps performed by a client computer in building and maintaining a list of logon list elements of the type illustrated in FIG. 8 corresponding to service logged onto a client computer.

Turning to FIG. 9, the steps are summarized for logging a service onto the client computer 20 and establishing a connection associated specifically with the LUID for the logged on service and the network server 30 by means of the redirector 22. It is noted that in accordance with the illustrative embodiment of the present invention, a specified service logs onto a client computer. Therefore, when a service logs onto the client computer 20 for which a logon list element does not currently exist, the service must provide identification and authentication information for the new service in accordance with the steps summarized in FIG. 9. This identification and authentication information is added to a linked list of logon list elements corresponding to logged on services on the client computer 20. (See FIG. 7).

In response to a service initiating a logon process for a service on the client computer 20, the service provides a username and password to the security system. After the service provides the identification and authentication information to the security system, control passes to step 152.

At step 152, a security system verifies the identification and authentication information. Verification is accomplished by querying a Security Accounts Manager (SAM) database. The SAM database contains a listing of all authorized service usernames, the passwords associated with the usernames, and the privileges and limitations assigned to the authorized services. After the identification and authentication information is verified by the security system of the client computer 20, control passes to step 154.

Next, at step 154, if the service's credentials (i.e., identification and authentication information) are not located in the SAM database, then access is denied to the service and control passes to an End step 162. If, however, at step 154, the service's credentials are located in the SAM database, then control passes to step 156 and the security system constructs an access token representing the privileges and limits associated with the authenticated service. Next, at step 158, an access token handle (also referred to as an LUID) associated with the access token is passed by the security system (along with the credentials of the authenticated service) to the redirector 22 of client computer 20. The access token handle accompanies all network requests originating from the logged on service and enables the redirector 22 to identify the connection with which the network request is associated.

At step 160, the redirector 22 constructs a logon list element (See FIG. 3) and adds the logon list element to the end of the linked list of logon elements (See FIG. 7). After the redirector 22 creates a logon list element for the authenticated service and adds the logon list element to the logon list element list (See FIG. 7), control passes to the End step 162, and processes running under the logged on service are now capable of submitting requests to the network server 30 via the redirector 22.

Figure 10:
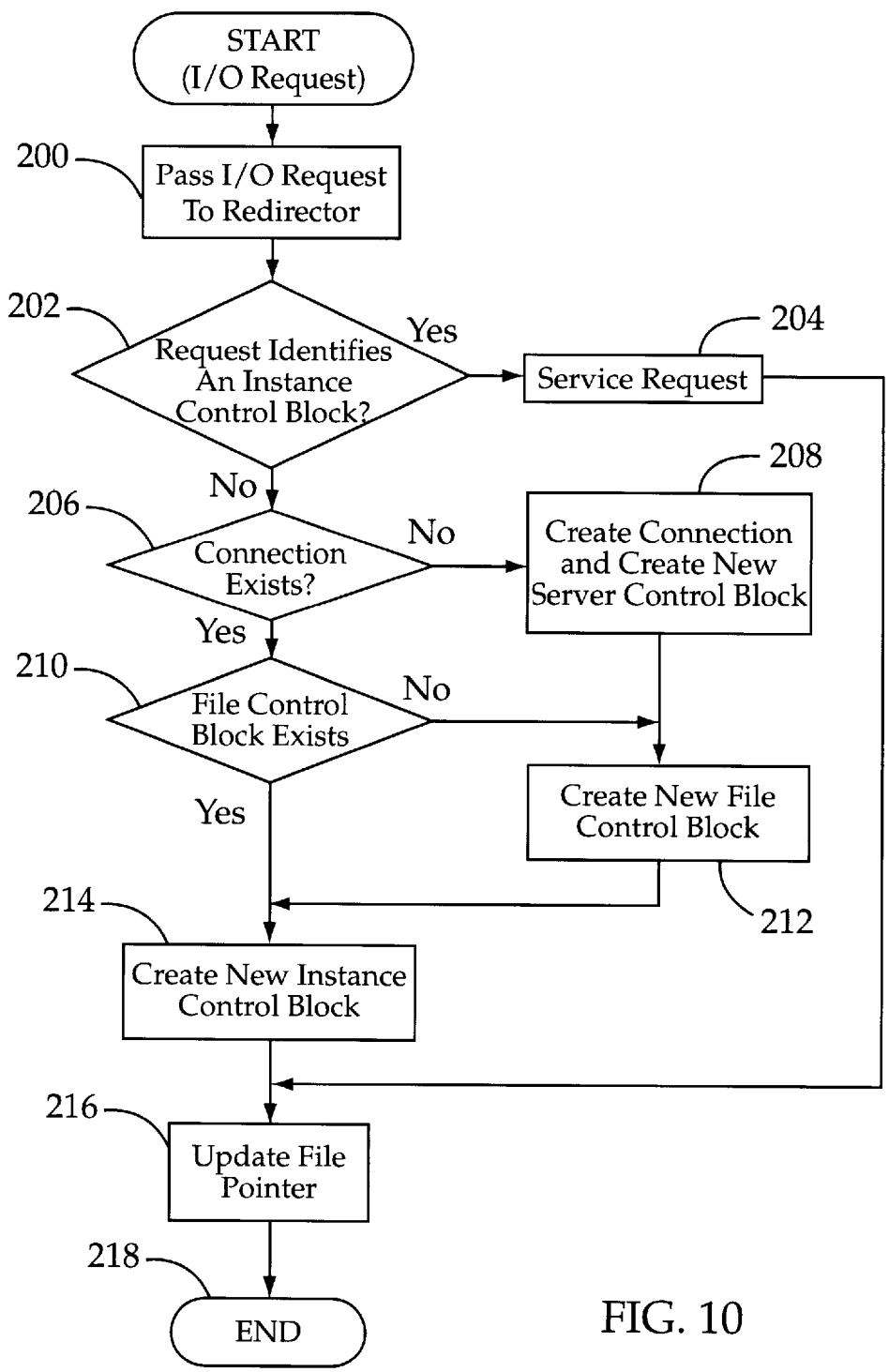
FIG. 10 is a flow chart summarizing the steps performed by a redirector of a client computer in building and maintaining a plurality of connections between a client computer and a network server.

Having described the steps of an illustrative service logon procedure, attention is now directed to FIG. 10 summarizing the steps for servicing a network request. When an I/O manager on the client computer 20 receives a network I/O request from a process on a service provided by the client computer, control passes to step 200. At step 200 the I/O manager creates an I/O Request Packet (IRP), calls a dispatch routine in the redirector 22 and passes the IRP to the redirector 22. Control passes to step 202.

At step 202, the redirector 22 determines whether the IRP contains a network request identifying an instance control block for an existing file. If the IRP identifies an instance control block, then control passes to step 204. At step 204 the redirector 22 forwards the request to the network server 30 via an established connection. The request packet from the redirector contains a connection number, a sequence number, process ID, file handle, a file pointer, and an amount of data to be read (if read). After the network request is serviced by the network server 30, control passes to step 216 (described below).

If however, at step 202, the IRP does not specify an instance control block associated with an existing file, then control passes to step 206. Typical instances where an instance control block is not provided in an IRP include when a process associated with the logged on service issues a network create file request, or when a drive or printer is redirected by a process running on one of the logged on services to a network volume or print queue. At step 206, the redirector 22 reviews the server control blocks to determine whether a connection exists between the service which issued the IRP and the identified server. If no connection currently exists (i.e., no server control block exists with the correct LUID and server ID for the specified connection), then control passes to step 208.

At step 208, the redirector 22 establishes a connection with the identified network server. In order to establish a connection to an identified network server, the redirector 22: (1) establishes a connection to a nearest server with which a connection may be established, queries the connected server for the address of the server to which the network request by the process is directed, (2) connects to the server, (3) logs into the server (may use the credentials in the logon list element), and (4) exchanges control information with the server in order to initiate a connection between the redirector 22 and the connected network server. The connection procedure and logon sequence is well known to those skilled in the art and is summarized in *Programmer's Guide To Netware*, by Charles Rose, pp. 292–300 (isbn 0-07-607029-8). The redirector 22 creates a new server control block for the new connection. Control then passes to step 212 (described below).

If, at step 206, a server control block does exist (i.e., a connection currently exists for the service from which the IRP was issued between the redirector 22 and the network server 30), then control passes directly from step 206 to step 210.

At step 210 the redirector 22 examines the path and file names associated with File Control Blocks linked to the Server Control Block identified by the redirector 22 during step 206 and determines whether one of the File Control Blocks corresponds to the path and file specified in the IRP. If at step 210 the redirector 22 determines that there is no File Control Block corresponding to the file specified in the IRP, then control passes to step 212.

At step 212, the redirector 22 communicates with the network server to perform the indicated command on the file, and the redirector 22 builds a new File Control Block corresponding to the path and file name specified in the IRP. The redirector 22 opens a handle to a designated volume (if necessary) and creates or opens a designated file in a manner known to those skilled in the art. Control then passes to step 214. If during step 210 the redirector 22 determines that a corresponding File Control Block does exist, then control passes directly to step 214.

At step 214 the redirector 22 builds a new Instance Control Block and inserts an application handle to enable a process responsible for issuing the IRP to subsequently access the particular instance of the accessed file (since a same process on a service may access several different points in a single file). Control then passes to step 216.

At step 216, the File Pointer field of the corresponding Instance Control Block is updated in accordance with any actions specified in the IRP. Control then passes to the End step 218.

An illustrative embodiment of the present invention as well as examples of various exemplary alterations to the illustrative embodiment have been described above. It would be known to one of ordinary skill in the area of network hardware and software architecture to make certain modifications to the embodiments described above. Such modifications include alterations to the specific contents of components of the redirector 22 in accordance with alternative authentication and security measures. Other modifications within the scope of the present invention include alterations to the status and control components of the control blocks which define the characteristics of the plurality of connections supported by the redirector. It is therefore the intent of the inventors to claim all alternative embodiments that do not depart from the scope and spirit of the invention described in the appended claims.

What is claimed is:

1. A client computer simultaneously supporting two or more networked services comprising:
    a network interface for connecting the client computer to a network server over communications facilities; and
    a redirector simultaneously supporting two or more connections over the communications facilities between the client computer and the network server, at least two of the connections each having a separate network credential and supporting at least two networked services.

2. The client computer of claim 1, wherein the redirector comprises a mechanism for maintaining information for the simultaneous connections.

3. The client computer of claim 2 wherein the mechanism for maintaining information includes a connection status database for storing independent control information blocks, the independent control information blocks comprising server control blocks, and each server control block corresponds to one of the simultaneous connections.

4. The client computer of claim 3, wherein the independent control information blocks further comprise file control blocks linked to the server control blocks, wherein each file control block specifies a file accessed through one of the simultaneous connections corresponding to one of the linked server control blocks.

5. The client computer of claim 4, wherein the client computer, prior to adding a second connection, determines that the second connection does not already exist between the client computer and a network server, and in response, adds the second connection without removing one of the at least two connections.

6. The client computer of claim 5, wherein the client computer, in determining that the second connection does not already exist, searches the connection status database for an entry corresponding to the networked service with the associated network server.

7. The client computer of claim 5, wherein a first of the at least two connections is assigned a first set of sockets for a first connection, and a second of the at least two connections is assigned a second set of sockets for a second connection.

8. The client computer of claim 1, further comprising a set of sockets for each one of the simultaneous connections.

9. The client computer of claim 1, wherein the network credentials associated with one of the simultaneous connections comprise a logon name and password supplied by one of the networked services.

10. The client computer of claim 1, further comprising a security system for receiving the network credentials from at least two of the networked services and assigning a unique identifier to each of these networked services in association with a logon procedure.

11. The client computer of claim 1, further comprising a security system for receiving the network credential from one of the networked services and assigning a unique identifier to the corresponding connection in association with a logon procedure.

12. The client computer of claim 1, wherein at least two of the simultaneous connections between the client computer and the network server are made using Netware Core Protocol (NCP).

13. The client computer of claim 1, wherein one of the networked services is remote file sharing.

14. The computer network of claim 13 wherein the network server is a file sharing server.

15. The computer network of claim 14 wherein the network server is a Netware Core Protocol (NCP) file sharing server.

16. The client computer of claim 1, wherein the network redirector further comprises: a logon element list comprising logon elements corresponding to logged on services; and a mechanism for maintaining control information for the at least two of the connections.

17. The client computer of claim 16, wherein the mechanism for maintaining control information includes a connection status database for storing independent control information blocks, the independent control information blocks comprising server control blocks, and each server control block corresponds to one of the simultaneous connections.

18. The client computer of claim 17, wherein the independent control information blocks comprise file control blocks, linked to the server control blocks, wherein each file control block specifies a file accessed through one of the simultaneous connections corresponding to one of the linked server control blocks.

19. The client computer of claim 16, wherein each network credential comprises a logon name and password supplied by one of the at least two networked services.

20. The client computer of claim 1, further comprising means for maintaining two or more network connections between the client computer and the network server over communications facilities.

21. A network redirector in a client computer for simultaneously supporting two or more connections over communications facilities between the client computer and a network server, at least two of the connections each having a separate network credential and supporting at least two networked services, the network redirector comprising:
    a logon element list comprising logon elements corresponding to logged on services; and
    a mechanism for maintaining control information for each of the plurality of independent connections.

22. The network redirector of claim 21, wherein the mechanism for maintaining information includes a connection status database for storing independent control information blocks, the independent control information blocks comprising server control blocks, and each server control block corresponds to one of the simultaneous connections.

23. The network redirector of claim 22, wherein the independent control information blocks comprise file control blocks, linked to the server control blocks, wherein each file control block specifies a file accessed through one of the simultaneous connections corresponding to one of the linked server control blocks.

24. The network redirector of claim 21, wherein each network credential comprises a logon name and password supplied by one of the at least two networked services.

25. The network redirector of claim 21, further comprising means for maintaining two or more network connections between the client computer and the network server over communications facilities.

26. A method for maintaining two or more network connections between a client computer and a network server over communications facilities, the client computer simultaneously supporting two or more networked services and having a connection status database and a redirector for receiving network requests from the networked services and forwarding the network requests to the network server, the method comprising the steps of:

establishing a first connection between the client computer and the network server in order to execute a first network request from a process associated with a first networked service;

receiving, by the redirector, a second network request from a process associated with a second networked service;

determining that a connection does not exist corresponding to the second network request, and in response, adding a second connection, without removing the first connection, between the client computer and the network server.

27. The method of claim 26, wherein the client computer, in association with the creation of a new connection between the client computer and the network server, performs the steps of:

formulating a control information block associated with the new connection; and storing a unique identification for the networked service and a network server identification within the control information block in the connection status database.

28. The method of claim 27, wherein the step of determining that a connection does not exist corresponding to the second network request comprises searching the connection status database for an entry corresponding to the networked service with the associated network server as specified in the second network request; and failing to find the entry in the connection status database.

29. The method of claim 26, further comprising assigning a first set of sockets for the first connection, and assigning a second set of sockets for the second connection.

\* \* \* \* \*